United States Patent [19]

Haisch et al.

[11] Patent Number: 4,941,252
[45] Date of Patent: Jul. 17, 1990

[54] TOOL FOR EXTRACTING ANCHOR BOLT FROM WALL

[76] Inventors: Bernhard M. Haisch, 519 Cringle Dr., Redwood City, Calif. 94065; Marilyn E. Bruner, 44 Roosevelt Cir., Palo Alto, Calif. 94306

[21] Appl. No.: 239,474

[22] Filed: Sep. 1, 1988

[51] Int. Cl.5 .............................................. B23P 19/04
[52] U.S. Cl. ...................................................... 29/261
[58] Field of Search ........................ 7/165; 29/231, 232, 29/240, 268, 258, 259, 260, 261, 262, 263, 280, 282, 283.5

[56] References Cited

U.S. PATENT DOCUMENTS

| | | |
|---|---|---|
| 986,133 | 3/1911 | Butsch .................................. 29/268 |
| 1,802,666 | 4/1931 | Mueller . |
| 2,302,691 | 11/1942 | Green ...................................... 7/165 |
| 2,470,327 | 5/1949 | Tener ..................................... 29/232 |
| 2,559,231 | 12/1949 | Seemar . |
| 2,610,013 | 1/1949 | Gibson . |
| 2,762,252 | 9/1956 | Karitzky . |
| 2,964,989 | 6/1958 | Croessant . |
| 3,139,675 | 7/1964 | Devine et al. . |
| 3,888,156 | 6/1975 | Fima . |
| 4,269,106 | 5/1981 | Leibhard . |
| 4,274,324 | 6/1981 | Giannuzzi . |
| 4,823,453 | 4/1989 | Bartlett ................................. 29/261 |

FOREIGN PATENT DOCUMENTS

| | | | |
|---|---|---|---|
| 1261809 | 2/1968 | Fed. Rep. of Germany ........ 29/268 |
| 2739166 | 3/1979 | Fed. Rep. of Germany ........ 29/268 |

*Primary Examiner*—Robert C. Watson
*Attorney, Agent, or Firm*—Townsend and Townsend

[57] ABSTRACT

A hand-held tool capable of removing an anchor bolt, such as a molly bolt, from attachment to a wall. The tool of the present invention includes a pair of jaw members which move into gripping relationship onto the exposed end flange of an anchor bolt, following which a lead screw on the tool engages the attachment screw of the anchor bolt and forces the attachment screw inwardly of the wall. This action causes the legs of the anchor bolt to bend and to be straightened and to become sufficiently narrow in transverse dimension so that the anchor bolt can be manually pulled out of the wall through the hole provided therefor. In this way, the tool permits a quick and easy removal of an anchor bolt from a wall without having to damage the wall in any way.

20 Claims, 8 Drawing Sheets

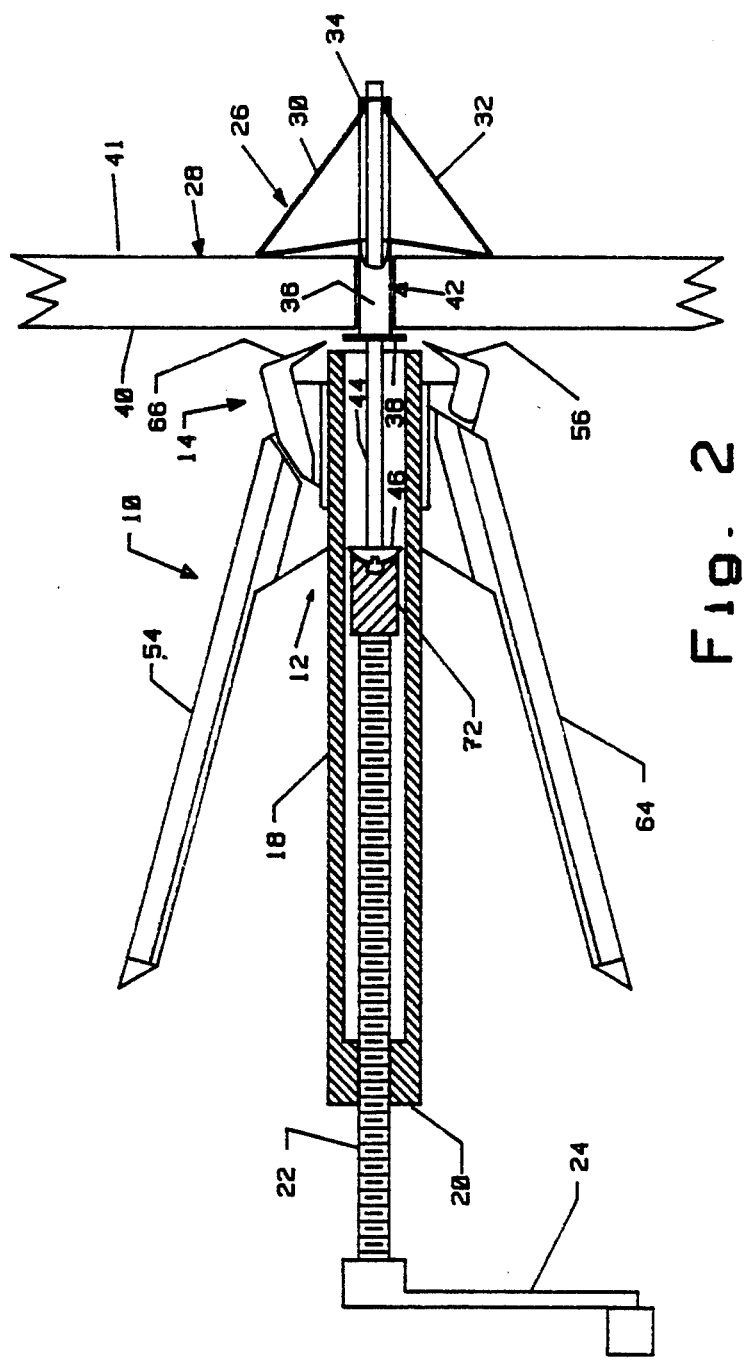

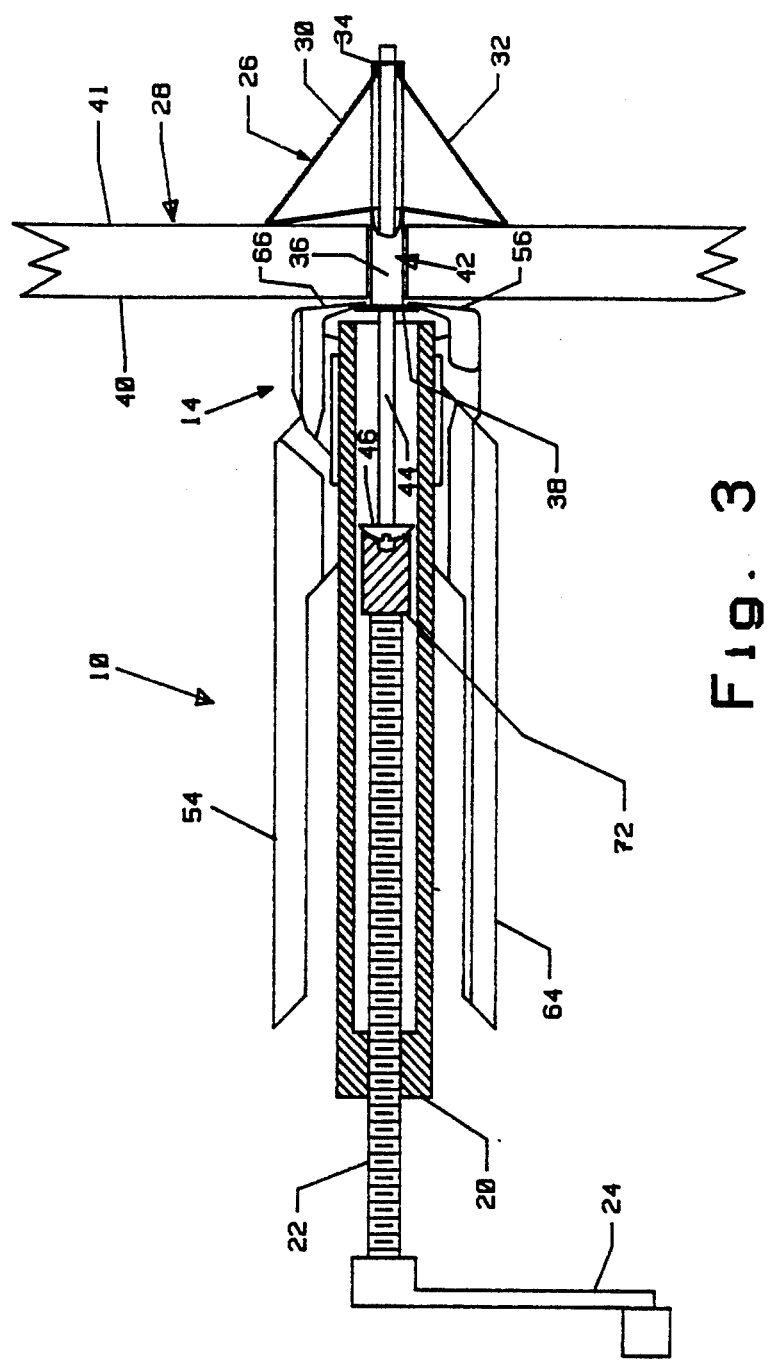

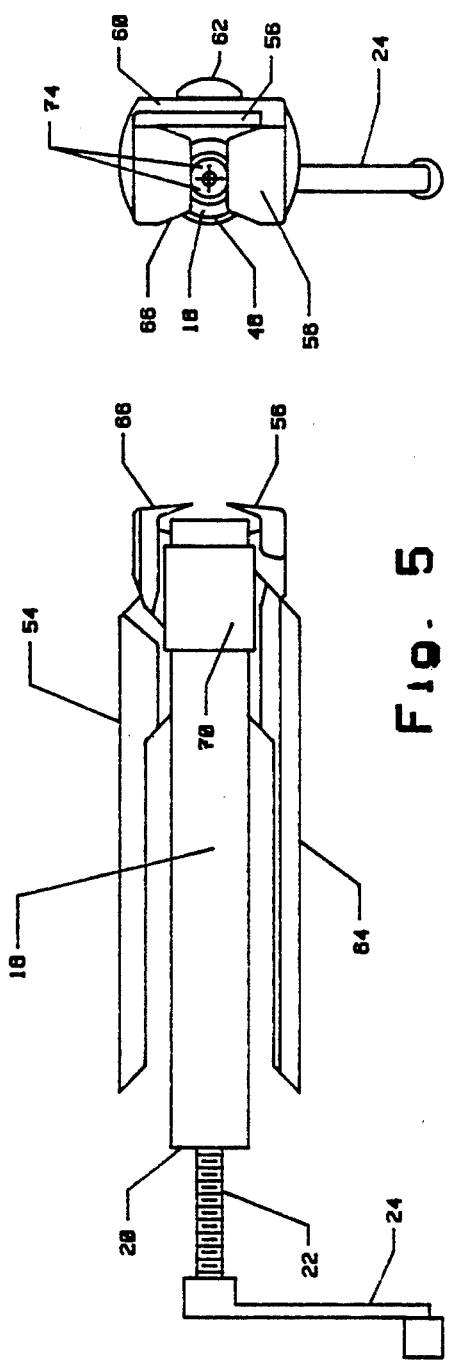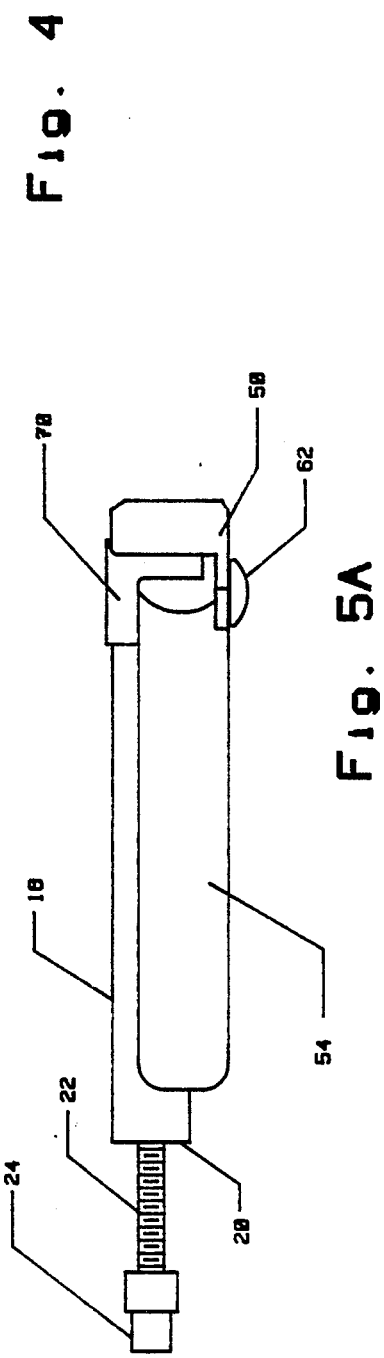

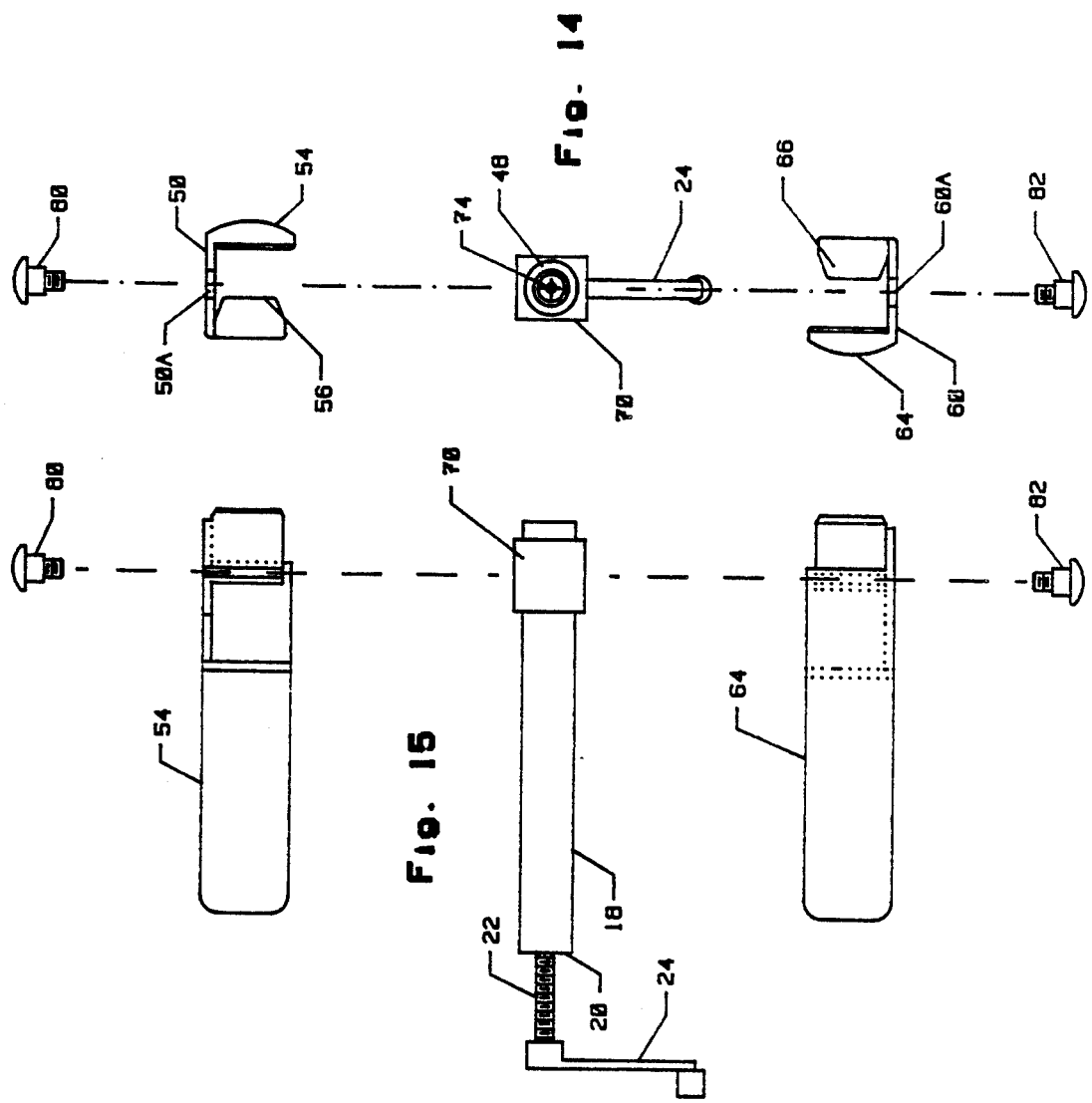

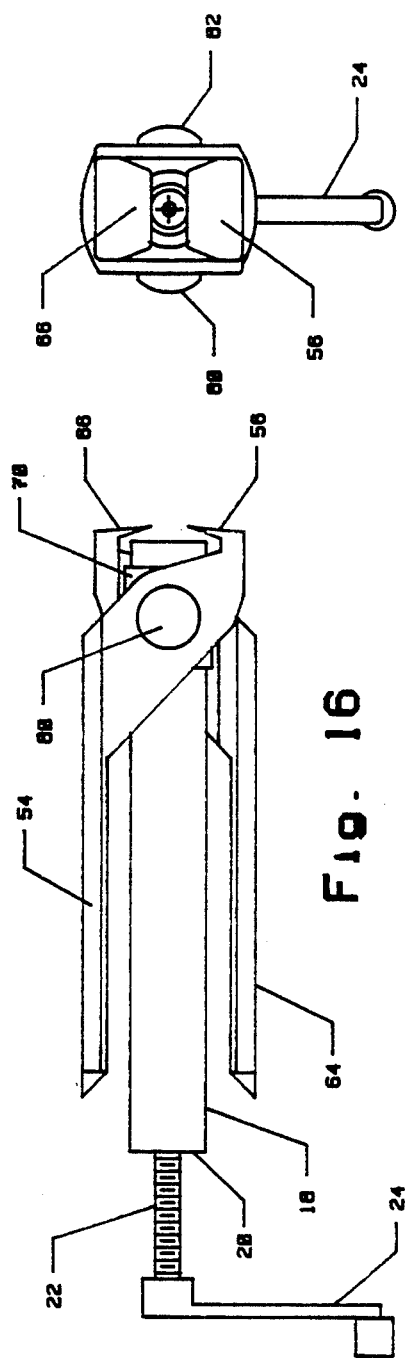
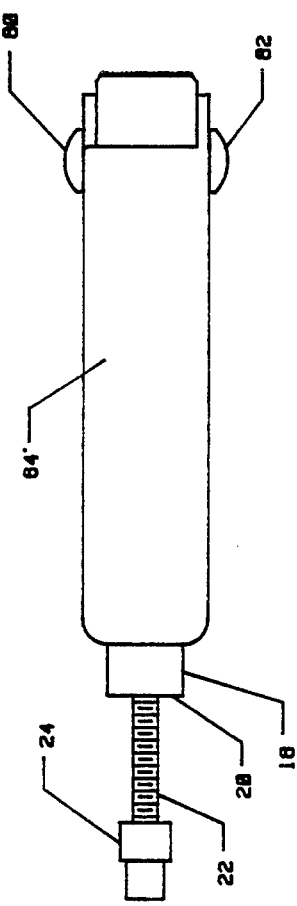

TOOL FOR EXTRACTING ANCHOR BOLT FROM WALL

BACKGROUND OF THE INVENTION

1. Field of the Invention

This invention relates to improvements in hand tools, and, more particularly, to a tool for use in removing anchoring devices from walls or the like.

Anchor bolts sometimes called "molly" bolts, are well known and have been used for years. Such anchor bolts are provided with bendable legs which are bent and spread apart after the anchor bolt has been placed in a hole in a wall and as a screw is threaded into a sleeve rigid to the inner ends of the legs. The expanded legs engage the inner surface of the wall and secure a front flange on the anchor bolt to the exposed surface of the wall. The screw threaded into the sleeve can be used to hang objects from the wall, such as picture frames.

Often it is desired to remove such an anchor bolt from the wall for one or more reasons. For instance, it may be desirable to re-paper the exposed surface of the wall and such re-papering task cannot be done properly if one or more anchor bolts are exposed on the wall. Generally, the wall must be cut or otherwise damaged to remove the anchor bolts therefrom. This requires repair of the wall which is a tedious and time consuming job.

2. Description of Prior Art

Several attempts have been disclosed in U.S. Pat. Nos. 1,802,666 and 3,139,675 for removing objects from a wall.

U.S. Pat. No. 1,802,666 describes a combination screw driver and pliers unit having jaws which open up and straddle the head of a bolt to be screwed into or out of a support. However, the patent fails to teach or suggest a tool for removing an anchor bolt from the wall.

U.S. Pat. No. 3,139,675 relates to the extraction of an expandable blind bolt, especially a bolt with a self-contained, multi-part nut and centering sleeve. However, this patent also fails to teach or suggest a tool for removing an anchor bolt from a wall.

Because of the problems of removing anchor bolts from walls and because of deficiencies in the prior art, a need exists for an improved tool for removing anchor bolts from walls. The present invention satisfies this need.

SUMMARY OF THE INVENTION

The present invention is directed to a handheld tool capable of removing an anchor bolt, such as a molly bolt, from attachment to a wall. The tool of the present invention includes structure, such as a pair of jaw members, which move into gripping relationship onto the exposed end flange of an anchor bolt, following which a device, such as a lead screw, ratchet or other mechanism on the tool, engages the attachment screw of the anchor bolt and forces the attachment screw inwardly of the wall. This action causes the legs of the anchor bolt to bend and to be straightened and to become sufficiently narrow in transverse dimension so that the anchor bolt can be manually pulled out of the wall through the hole provided therefor. In this way, the tool of the present invention permits a quick and easy removal of an anchor bolt from a wall without having to damage the wall in any way. Thus, the hole in which the anchor bolt was originally placed can be filled with plaster or the like and left with an appearance which does not reveal that it once had a hole in it.

Moreover, the anchor bolt is not damaged by its being removed from the wall by the tool. Thus, the anchor bolt can be used again.

The primary object of the present invention is to provide an improved hand tool for removing an anchor bolt from a wall wherein a tool operates to change the shape of several parts of the anchor bolt when the latter is in place within a wall so that the anchor bolt can cleanly be removed from the wall without damage to the wall.

Other objectives of this invention will become apparent as the following specification progresses, reference being made to the accompanying drawings for an illustration of the invention.

BRIEF DESCRIPTION OF THE DRAWINGS

FIG. 2 is a view similar to FIG. 1 but showing the tool with the jaw members being open and ready to clamp onto a flange of a molly bolt to be removed from a wall;

FIG. 3 is a view similar to FIG. 2 but showing the jaws closed and clamped onto the flange of the molly bolt;

FIG. 4 is an end elevational view of the tool;

FIG. 5 is a side elevational view of the tool;

FIG. 5A is a view similar to FIG. 5 but showing a different aspect of the tool;

FIGS. 14 and 15 are exploded views of a second embodiment of the tool showing a pair of pivots for the jaws; and FIGS. 16, 17 and 18 are views similar to FIGS. 4, 5 and 5A but relating to the second embodiment of the tool.

DETAILED DESCRIPTION OF THE PREFERRED EMBODIMENT

Figure 1:
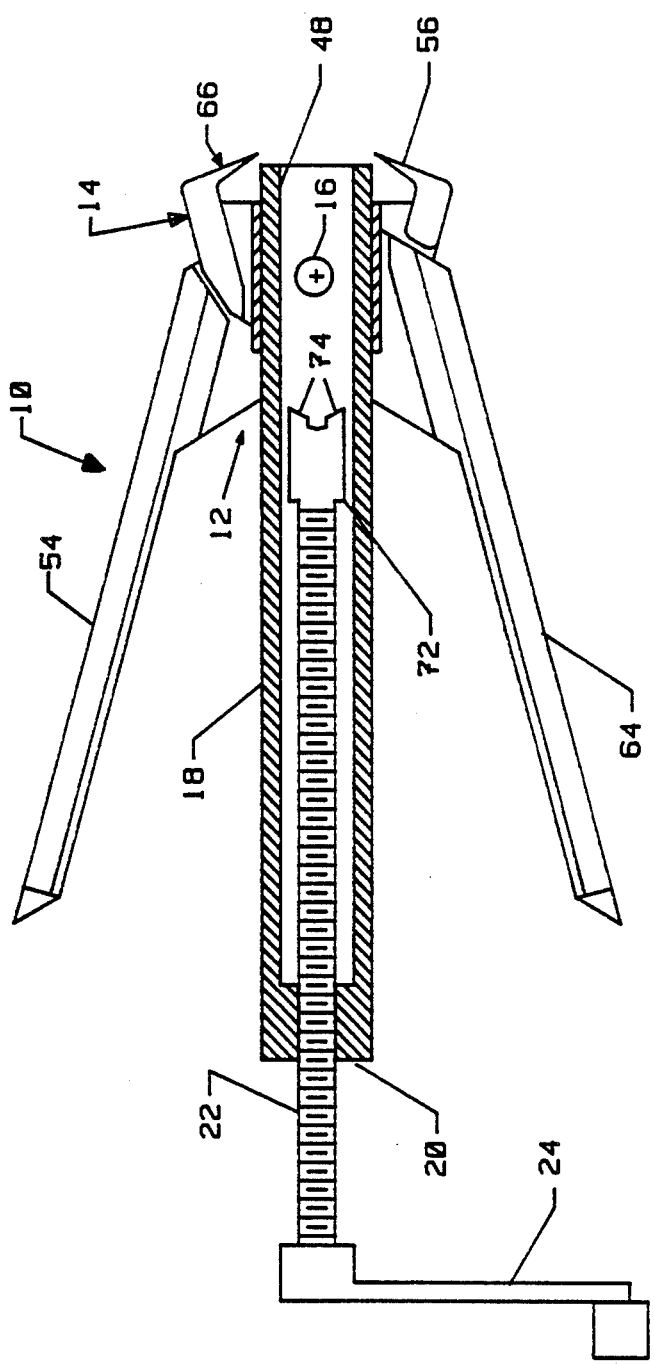
FIG. 1 is a side elevational view, partly in section, of a tool of the present invention for extracting an anchor bolt from a wall, the jaw members of the tool being open.

A first embodiment of the tool of the present invention is broadly denoted by the numeral 10 and includes a pair of relatively shiftable jaw members 12 and 14 pivotally mounted by shaft 16 on a tube 18 near one open end thereof, the tube having an internally threaded boss 20 for threadably receiving a lead screw 22 having a turning handle 24 at the outer end thereof. Tool 10 is adapted for removing an anchor bolt 26 (FIGS. and 3) from anchored relationship in a wall 28. The anchor bolt 26 is of the type known as a molly bolt and has a pair of bendable legs 30 and 32 coupled at first ends thereof to an internally threaded sleeve 34. A sleeve 36 is at the other end of the legs. Sleeve 36 has an annular flange 38 for engaging the adjacent outer face 40 of wall 28 after the anchor bolt 26 has been inserted into a hole 42 in the wall and projects inwardly from the inner surface 41 of wall 28. The hole 42 is of a diameter sufficient to allow insertion of the anchor bolt 26 through the hole when the legs 30 and 32 are in retracted (straightened) or collapsed positions.

A screw 44 having a head 46 thereon is inserted into and through sleeve 36 of the anchor bolt 26, and the screw is threaded into sleeve 34. As head 46 of screw 44 engages flange 38 of anchor bolt 26, the screw 44 tends to extend out of the inner end of sleeve 34 and as it does, sleeve 34 moves axially of screw 44 to the left when viewing FIG. 2 because the screw is prevented from moving to the right when viewing FIG. 3 by virtue of its engagement with flange 38. As sleeve 34 moves axially to the left, legs 30 and 32 yield or bend at their center points and assume the configuration of FIGS. 2 and 3 in which the legs bear against the inner surface 41 of wall 28, thereby anchoring the anchor bolt 26 in the wall since the anchor bolt cannot be removed from the hole 42 in the wall because of the expansion of the legs 30 and 32.

The anchor bolt 26 as described above is of conventional construction and the way in which it is used is also conventional.

Tool 10 is used to change the configuration of the anchor bolt so that its legs 30 and 32 will be collapsed or straightened to permit the anchor bolt 26 to be small enough in transverse dimension to be manually removed from wall 28 by pulling it outwardly through hole 42 in the wall.

Tube 18 (FIG. 1) of tool 10 has an open end 48 shown in FIG. 1. Open end 48 is adjacent to shaft 16 which pivotally mounts jaw members 12 and 14 on tube 18.

Figure 9:
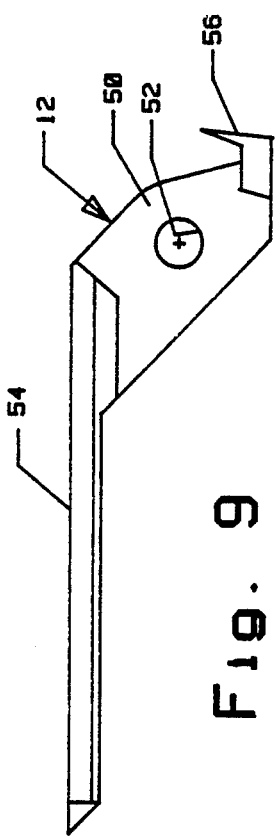

FIG. 9 shows jaw member 12 as having a web 50 provided with a central hole 52 therethrough for receiving shaft 16. A handle 54 is on one end of web 50 and extends normally parallel with tube 18 when the jaw members 12 and 14 are in their closed positions as shown in FIG. 2.

Figure 10:
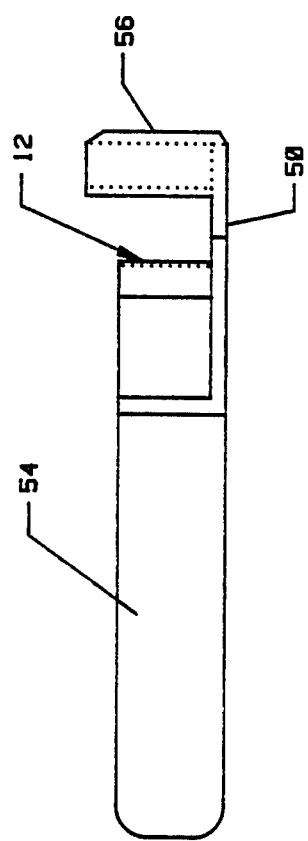

Jaw member 12 has a blade 56 on web 50 at the opposite end of the web as shown in FIGS. 9 and 10. Blade 56 extends laterally from web 50 as does handle 54.

Figure 8:
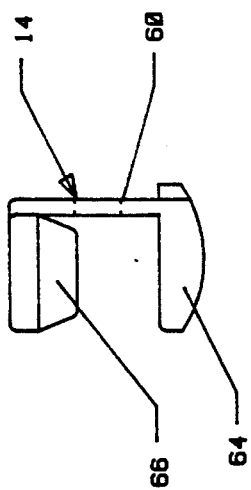
FIG. 8 is an end elevational view of the jaw member of FIGS. 6 and 7.
Figure 6:
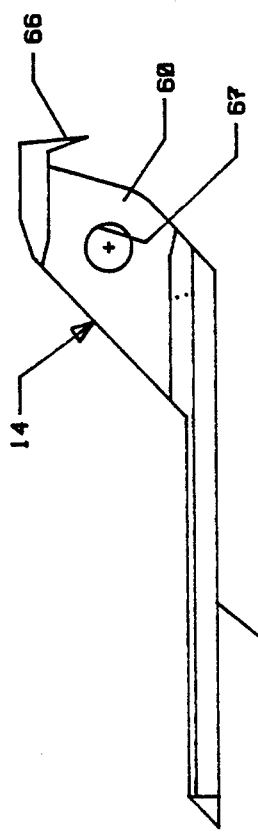
FIG. 6 is a side elevational view of one of the jaw members of the tool.
Figure 7:
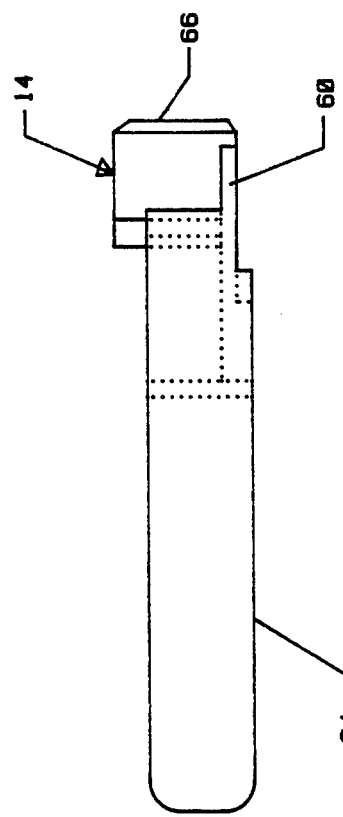
FIG. 7 is a top plan view of the jaw member of FIG. 6.
Figure 11:
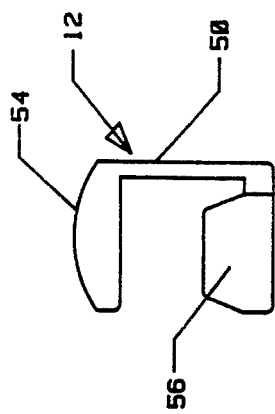
FIGS. 9, 10, and 11 are views similar to FIGS. 6, 7 and 8 but showing the other jaw member of the tool.

Jaw member 14 as shown in FIGS. 6–8 includes a web 60 provided with a central hole 62 therethrough for receiving shaft 16. A handle 64 is integral with one end of web 60 and is normally parallel with tube 18 and handle 54 as shown in FIG. 2 when the jaw members are in their closed conditions. A blade 66 is secured to web 60 at the opposite end thereof. Blade 66 extends laterally from web 60 as shown in FIG. 7.

Figure 12:
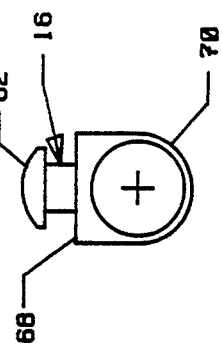
FIG. 12 is a shaft assembly for coupling the jaw members of the tool together for pivotal movement relative to the main body of the tool.
Figure 13:
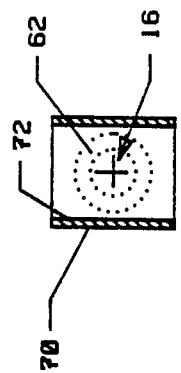
FIG. 13 is a tubular element forming part of the shaft assembly of FIG. 12.

Shaft 16 is coupled to a flat side 68 of a tubular element 70 (FIGS. 12 and 13), the element 70 having an inner surface 72 which is complemental to the outer surface of tube 18 so that element 70 can be press fitted or otherwise secured onto tube 18 near open end 48 thereof. When so placed on the tube 18, element 70 will orient the shaft 16 so that it passes through holes 52 and 62 of webs 50 and 60, respectively. When so mounted, webs 50 and 60 are in juxtaposition to each other so they can pivot relative to each other. Thus, element 70 and shaft 16 mount jaw members 12 and 14 on tube 18 for pivotal movement so that the blades 56 and 66 can be moved toward and away from each other. Blades 56 and 66 are shown in their closed, operative positions in FIG. 3 and in their open positions shown in FIG. 1. In a sense, blades 56 and 66 operate as the jaws of a pair of pliers.

The inner end of lead screw 22 of tool 10 includes a follower member 72 (FIGS. 1–3) having inclined, end surface portions 74 as shown in FIG. 1. The surface portions 74 are adapted to engage the head 46 of screw 44 for pushing the screw to the right when viewing FIG. 2 and 3 when lead screw 22 is moved to the right when viewing FIG. 1 upon the rotation of handle 24 relative to boss 20.

Tool 10 is assembled by threadably mounting lead screw 22 on boss 20 so that follower member 72 is near the open end 48 of tube 18. Then, jaw members 12 and 14 are coupled to shaft 16 so that their assembly appears as shown in FIGS. 5 and 5A with webs 50 and 60 side by side with respect to each other. Then element 70 which carries shaft 16 is press fitted or otherwise secured on tube 18 near open end 48 thereof so that, when the jaw blades 56 and 66 are closed, handles 54 and 64 will be parallel with each other and on opposite sides of tube 18 as shown in FIGS. 3 and 5. To open the jaws, handles 54 and 64 move away from tube 18 and the jaw blades open as shown in FIG. 1.

In use, it will be assumed that an anchor bolt 26 is in wall 28 in the manner shown in FIGS. 2 and 3 in which legs 30 and 32 of the anchor bolt are spread apart relative to each other.

Screw 44 is backed off into the position shown in FIGS. 2 and 3 yet the screw is still threadably coupled to sleeve 34 of anchor bolt 26. With jaw blades 56 and 66 open as shown in FIGS. 1 and 2, the tool 10 is brought close to side 40 of wall 28 and the outwardly projecting portion of screw 44 is received within the open end 48 of tube 18. Blades 56 and 66 are then closed underneath flange 38 of anchor bolt 26 so that the tool is effectively coupled to the anchor bolt.

Handle 24 is then rotated until the screw follower member 72 engages head 46 of screw 44. After engagement with the head and continued rotation of handle 24, screw 22 moves to the right when viewing FIGS. 2 and 3 and as it does so, it forces screw 44 to the right when viewing FIGS. 2 and 3. This action causes legs 30 and 32 to be bent so that the legs straighten and become generally parallel with each other once again. This is possible because screw 44 is threadably coupled with sleeve 34 of the anchor bolt. Finally, legs 30 and 32 will become sufficiently parallel so that the transverse width of anchor bolt 26 is small enough to allow the anchor bolt to slip through hole 42 and out of the wall 28.

Tool 10, therefore, provides a simple means to quickly and easily remove an anchor bolt from a wall without damaging the wall or the anchor bolt itself. Thus, the anchor bolt can be used again, if desired. The tool can be used without an special skills and can be made inexpensively and can be used indefinitely without repair or replacement.

Handles 54 and 64 may be pivotally mounted by a pair of screws 80 and 82 which pass through webs 50 and 60 of handles 54 and 64. Thus, a single handle design can be used for handles 54 and 64. The webs are on opposite sides of the center element 70, and the screws 80 and 82 are threadably coupled to the element 70 after the screws have passed through holes 50A and 60A of webs 50 and 60. Tool 10 with the two screws 80 and 82 thereon have the appearance as shown in FIGS. 16–18. The tool is used in the same way as that described above with respect to tool 10 of FIGS. 1–13.

Other embodiments of the tool could be provided if desired. For instance, a pistol grip version could be provided in which handle 54 and 64 would be replaced with a pistol grip arrangement. Screw 22 can be a left-hand threaded screw. This feature keeps the anchor bolt screw 44 from turning when engaged by follower 72. Instead of a screw 22, a ratchet or other mechanism could be used to advance the anchor bolt screw 44.

We claim:

1. A tool for removing an anchor bolt from attachment to a wall with the anchor bolt having a flange at one end thereof, an internally threaded sleeve at the opposite end, and an attachment screw threaded into the sleeve and located adjacent to a pair of bendable legs between the flange and the sleeve, the tool comprising:
    a support;
    means pivotally mounted on the support near one end thereof for coupling the support with the flange of the anchor bolt, said support having means for allowing movement of the attachment screw relative to said coupling means when the support is coupled to said flange; and
    means carried by the support and engagable with the attachment screw of the anchor bolt for moving the attachment screw longitudinally of the anchor bolt and relative to the coupling means when the attachment screw is threaded into the sleeve, whereby the legs of the anchor bolt will be caused to become straightened until the transverse dimension of the anchor bolt is sufficient to allow it to be removed from the wall.

2. A tool as set forth in claim 1, wherein said coupling means includes a pair of jaw members, each jaw member including a jaw blade for placement between the flange and the wall in which the anchor bolt is secured.

3. A tool as set forth in claim 1, wherein said means for moving the attachment screw includes a lead screw having means thereon for engaging and forcing the attachment screw in a predetermined direction as a function of the rotation of lead screw.

4. A tool for removing an anchor bolt from attachment to a wall with the anchor bolt having a flange at one end thereof, an internally threaded sleeve at the opposite end, and an attachment screw threaded into the sleeve and located adjacent to a pair of bendable legs between the flange and the sleeve, the tool comprising;
    a tube having a pair of opposed ends, one end of the tube being open;
    a pair of jaw members pivotally mounted on the support near said one end thereof, said jaw members having respective jaw blades adapted to be coupled with the flange of the anchor bolt; and
    a lead screw rotatably coupled to the tube at the opposite end thereof, said lead screw having a follower member within the tube and engagable with the attachment screw of the anchor bolt for moving the attachment screw longitudinally of the anchor bolt when the attachment screw is threaded into the sleeve, whereby the legs of the anchor bolt will be caused to be straightened until the transverse dimension of the anchor bolt is sufficient to allow it to be removed from the wall.

5. A tool as set forth in claim 4, wherein each jaw member has a handle extending longitudinally of the tube.

6. A tool as set forth in claim 4, wherein said tube has an internally threaded boss near the opposite end thereof, said lead screw being threadably coupled to said boss, there being a handle on the lead screw for manually rotating the latter.

7. A tool as set forth in claim 4, wherein each of said jaw members includes a handle, and means for interconnecting the jaw blade and the handle of each jaw member, respectively.

8. A tool as set forth in claim 7, wherein said interconnecting means includes a web.

9. A tool as set forth in claim 8, wherein the webs of the jaw members are in side-by-side relationship to each other.

10. A tool as set forth in claim 8, wherein said tube has a shaft mounted thereon for pivotally mounting the webs of the jaw members.

11. A tool as set forth in claim 10, wherein said shaft is on a tubular element telescoped on and secured to the tube.

12. A tool for removing an anchor bolt from attachment to a wall with the anchor bolt having a flange at one end thereof, an internally threaded sleeve at the opposite end, and an attachment screw threaded into the sleeve and located adjacent to a pair of bendable legs between the flange and the sleeve, the tool comprising:
    a support, including a tube having an open end for receiving the adjacent portion of the attachment screw;
    means pivotally mounted on the support near one end thereof, for coupling the support with the flange of the anchor bolt; and
    means carried by the support and engagable with the attachment screw of the anchor bolt for moving the attachment screw longitudinally of the anchor bolt when the attachment screw is threaded into the sleeve, whereby the legs of the anchor bolt will be caused to become straightened until the transverse dimension of the anchor bolt is sufficient to allow it to be removed from the wall.

13. A tool for removing an anchor bolt from attachment to a wall with the anchor bolt having a flange at one end thereof, an internally threaded sleeve at the opposite end, and an attachment screw threaded into the sleeve and located adjacent to a pair of bendable legs between the flange and the sleeve, the tool comprising:
    a support;
    a pair of jaw members pivotally mounted on the support near one end thereof for coupling the support with the flange of the anchor bolt, each jaw member including a jaw blade for placement between the flange and the wall in which the anchor bolt is secured, each jaw member having a handle extending longitudinally of the support, and
    means carried by the support and engagable with the attachment screw of the anchor bolt for moving the attachment screw longitudinally of the anchor bolt when the attachment screw is threaded into the sleeve, whereby the legs of the anchor bolt will be caused to become straightened until the transverse dimension of the anchor bolt is sufficient to allow it to be removed from the wall.

14. A tool for removing an anchor bolt from attachment to a wall with the anchor bolt having a flange at one end thereof, an internally threaded sleeve at the opposite end, and an attachment screw threaded into the sleeve and located adjacent to a pair of bendable legs between the flange and the sleeve, the tool comprising:
- a support, including an elongated tube having an open end for receiving the attachment screw;
- means pivotally mounted on the support near one end thereof for coupling the support with the flange of the anchor bolt; and
- a lead screw threadably coupled to the tube and extending longitudinally thereof, said lead screw having a follower member on one end thereof for engaging the attachment screw of the anchor bolt for moving the attachment screw longitudinally of the anchor bolt when the attachment screw is threaded into the sleeve, whereby the legs of the anchor bolt will be caused to become straightened until the transverse dimension of the anchor bolt is sufficient to allow it to be removed from the wall.

15. A tool as set forth in claim 14, wherein said tube has an internally threaded boss near the opposite end thereof, such lead screw being threadably coupled to said boss, there being a handle on the lead screw for manually rotating the latter.

16. A tool for removing an anchor bolt from attachment to a wall with the anchor bolt having a flange at one end thereof, an internally threaded sleeve at the opposite end, and an attachment screw threaded into the sleeve and located adjacent to a pair of bendable legs between the flange and the sleeve, the tool comprising:
- a support;
- a pair of jaw members pivotally mounted on the support near one end thereof for coupling the support with the flange of the anchor bolt, each jaw member including a jaw blade, a handle and means for interconnecting the jaw blade and the handle; and
- means carried by the support and engagable with the attachment screw of the anchor bolt for moving the attachment screw longitudinally of the anchor bolt when the attachment screw is threaded into the sleeve, whereby the legs of the anchor bolt will be caused to become straightened until the transverse dimension of the anchor bolt is sufficient to allow it to be removed from the wall.

17. A tool as set forth in claim 16, wherein said interconnecting means includes a web.

18. A tool as set forth in claim 17, wherein the webs of the jaw members are in side-by-side relationship to each other.

19. A tool as set forth in claim 18, wherein said support has a shaft mounted thereon for pivotally mounting the webs of the jaw members.

20. A tool as set forth in the claim 14, wherein the support comprises of a tube, said shaft being on a tubular element telescoped on and secured to the tube.

* * * * *